May 11, 1948.  E. L. SUTTER  2,441,213
BALLAST UNIT
Filed Aug. 30, 1945

INVENTOR.
ERWIN L. SUTTER
BY

Patented May 11, 1948

2,441,213

UNITED STATES PATENT OFFICE 2,441,213

BALLAST UNIT

Erwin L. Sutter, Sharon, Mass., assignor to Tobe Deutschmann Corporation, Canton, Mass., a corporation of Massachusetts Application August 30, 1945, Serial No. 613,657

4 Claims. (Cl. 175—357)

The present invention relates to a container and more particularly to a container for a ballast unit for fluorescent lighting fixtures. These ballast units are made up of transformers, chokes and condensers for providing the proper transformation and power factor between the line and the fluorescent tube. For the most part the unit is made of coils and condensers which are assembled in a container sealed in with wax and mounted on some part of the lighting fixture.

Under normal operating conditions where the unit is sufficiently cooled or where the heat given off by the unit is not great, operation will continue without great difficulty. If, however, the current drawn through the chokes and transformer windings is large, the coils may heat up and cause the whole ballast unit to operate under extremely high temperature conditions. While the coils may operate successfully at fairly high temperatures under certain conditions, capacitors are often of such construction that while they are able to withstand high voltages, undue heating may cause such deterioration of the dielectric so that the capacitors will burn out.

In the present invention the ballast unit is so constructed that while the transformer windings or coils may operate under high temperature conditions, the capacitors in the ballast unit keep sufficiently cool so that their life will be substantially prolonged. The ballast unit for this purpose is divided into two parts with the windings carrying current comprising a potted assembly wherein the coils are buried in a high melting point wax, wax and asphalt compound or some other suitable insulating substance. The other part of the unit comprising the capacitor is supported by the casing or frame in which the first part of the unit is contained but is so spaced from the winding or choke unit that while in the same assembly it may be kept cool and readily changed or replaced.

The present invention is an improvement over my recently filed application, Serial No. 605,055, filed July 14, 1945, in certain respects which will appear from the specification below when taken in connection with the drawing illustrating an embodiment of the same in which.

Figure 1:
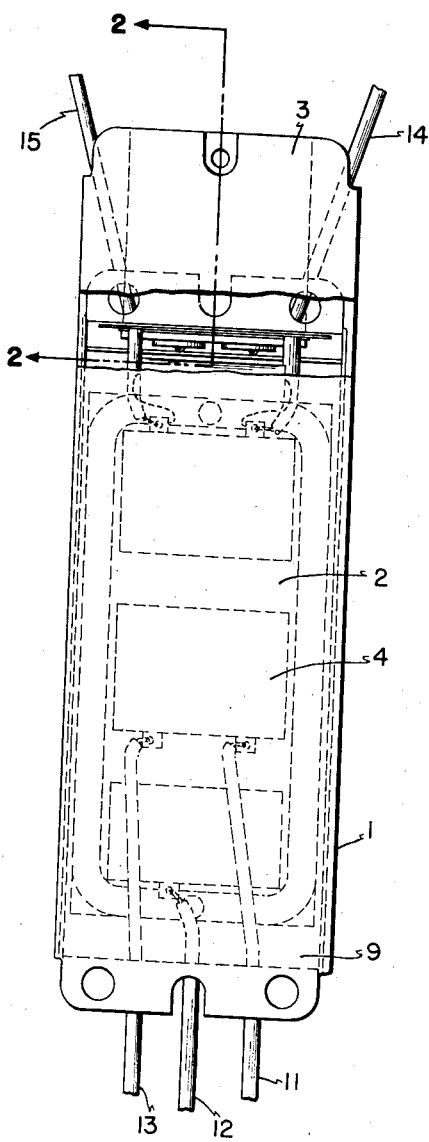
Figure 1 shows a plan view of the ballast unit with a portion of the cover broken away.
Figure 3:
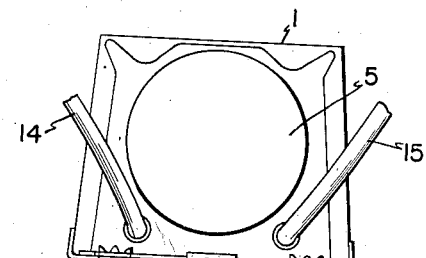
Figure 3 shows an end view looking at the top end of Figure 1.
Figure 2:
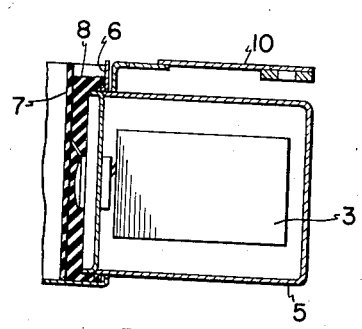
Figure 2 shows a section on the line 2—2 of Figure 1.

In accordance with the arrangement of Figure 1, the transformer ballast unit 4 is secured in the container 1 by being embedded in a high melting point wax 2 which fills the container around the transformer and choke units. At the top end of the container, as viewed in Figure 1, there is retained a capacitor unit 3 which, as shown in Figure 2, is contained in a can 5 which projects through a hole at the top end of the container. Within the container the can 5 is provided with a thin flange 6 approximately the shape of the cross section of the end of the container against which it rests. Just forward of the flange 6 (Figure 2) is partition 7 of cardboard or the like and between the cardboard and the flange 6 the space may be filled with a wax compound 8.

The container is provided with a cover 9 which extends over the box and beyond, as shown in the section 10, to the end of the capacitor can 5.

In the manufacture of the device the capacitor unit may be first inserted in place from the inside of the container 1 and then wax sealed in place after connections have been made. The transformer and choke unit will be installed after the capacitor unit is in place and all electrical connections may then be made before any of the units are wax sealed.

Three leads 11, 12 and 13 may be taken out of the end of the case at one end just under the cover and two leads 14 and 15 at the other end.

What has been mentioned in my co-pending application, above mentioned, with regard to mounting on the light fixture and circuit connection applies also here. The modified form of construction herein set forth provides a simple means of separating the hotter operating elements of the unit from the colder and permitting circulation in the capacitor unit of the free air, as well as a simpler means of replacement. For this purpose, if desired, the capacitor unit need not be wax sealed, the cardboard partition 7 and the electrical connection being sufficient to hold the capacitor in place.

Having now described my invention, I claim:

1. A container for a ballast unit comprising an elongated casing having a hole at one end, a capacitor element having substantially the form of said opening with a flange at one end having its outer contour in the shape of the contour of the inside end of the container, said capacitor unit projecting through the hole in said casing with the flange of the capacitor unit against the inside end wall of the casing.

2. A container for a ballast unit comprising an elongated casing having a hole at one end, a capacitor element having substantially the form of said opening with a flange at one end having its outer contour in the shape of the contour of the inside end of the container, said capacitor unit projecting through the hole in said casing with the flange of the capacitor unit against the inside end wall of the casing, a transformer and choke unit embedded in wax within said casing and spaced apart from the end of the casing where the capacitor is positioned, and means securing the capacitor at one end of said casing.

3. A container for a ballast unit comprising an elongated casing having a hole at one end, a capacitor element having substantially the form of said opening with a flange at one end having its outer contour in the shape of the contour of the inside end of the container, said capacitor unit projecting through the hole in said casing with the flange of the capacitor unit against the inside end wall of the casing, a cover covering said casing and extending beyond the end thereof, where the capacitor unit is positioned, substantially the distance of said capacitor unit.

4. A container for a ballast unit comprising an elongated casing having a hole at one end, a capacitor element having substantially the form of said opening with a flange at one end having its outer contour in the shape of the contour of the inside end of the container, said capacitor unit projecting through the hole in said casing with the flange of the capacitor unit against the inside end wall of the casing, a cover covering said casing and extending beyond the end thereof, where the capacitor unit is positioned, substantially the distance of said capacitor unit, and electrical connections connecting through the end walls of the casing beneath said cover element.

ERWIN L. SUTTER.

REFERENCES CITED

The following references are of record in the file of this patent:

UNITED STATES PATENTS

| Number | Name | Date |
|---|---|---|
| 899,634 | Thordarson | Sept. 29, 1908 |
| 1,585,811 | Wilson et al. | May 25, 1926 |
| 2,114,189 | Kronmiller | Apr. 12, 1938 |
| 2,227,970 | Hill | Jan. 7, 1941 |